(12) United States Patent
Ikeda et al.

(10) Patent No.: US 9,970,784 B2
(45) Date of Patent: May 15, 2018

(54) CABLE WITH SENSOR

(71) Applicant: Hitachi Metals, Ltd., Tokyo (JP)

(72) Inventors: Yukio Ikeda, Hitachi (JP); Shinya Oeda, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 73 days.

(21) Appl. No.: 14/966,312

(22) Filed: Dec. 11, 2015

(65) Prior Publication Data

US 2016/0178395 A1 Jun. 23, 2016

(30) Foreign Application Priority Data

Dec. 19, 2014 (JP) ................................. 2014-257348

(51) Int. Cl.
| | |
|---|---|
| *G01B 7/30* | (2006.01) |
| *H01R 43/00* | (2006.01) |
| *H05K 13/00* | (2006.01) |
| *G01D 5/14* | (2006.01) |
| *G01D 5/245* | (2006.01) |
| *G01D 11/24* | (2006.01) |
| *G01D 11/30* | (2006.01) |

(52) U.S. Cl.
CPC ............ *G01D 5/142* (2013.01); *G01D 5/245* (2013.01); *G01D 11/245* (2013.01); *G01D 11/30* (2013.01)

(58) Field of Classification Search
CPC .................................... G01B 7/14; G01B 7/30
USPC ........................................ 324/207.11, 207.25
See application file for complete search history.

(56) References Cited

U.S. PATENT DOCUMENTS

| | | | |
|---|---|---|---|
| 6,288,532 B1 * | 9/2001 | Steinauer et al. ............ 324/173 |
| 7,909,661 B2 * | 3/2011 | Wu ....................... H01R 12/721 |
| | | | 439/357 |
| 8,006,549 B2 * | 8/2011 | Hofler et al. ................... 73/121 |

(Continued)

FOREIGN PATENT DOCUMENTS

| | | |
|---|---|---|
| EP | 1359424 A2 | 11/2003 |
| JP | 05314830 A * | 11/1993 |

(Continued)

OTHER PUBLICATIONS

The Abstract, JP 05314830 A, Miyataki et al, Nov. 1993.*
Written Opinion issued in the corresponding French patent Application No. 1562360 dated Aug. 23, 2017.

*Primary Examiner* — Bot Ledynh
(74) *Attorney, Agent, or Firm* — Roberts Mlotkowski Safran Cole & Calderon P.C.

(57) ABSTRACT

A cable with a sensor includes electrically insulated wires, a sheath for covering the electrically insulated wires together, a sensor, and a housing for sealing one end of the sheath, while receiving at least a portion of the sensor. The housing includes a receiving portion for receiving the at least portion of the sensor, a lead out portion for the sheath being drawn therefrom, and a curved cylinder section having a circular cross section. The curved cylinder section is provided between the receiving portion and the lead out portion, to hold the electrically insulated wires. The curved cylinder section is made of a molded resin formed in a circular cross sectional shape at right angles to a direction of extending of the electrically insulated wires. The electrically insulated wires are held in the middle of the circular cross section of the curved cylinder section.

15 Claims, 9 Drawing Sheets

(56) References Cited

U.S. PATENT DOCUMENTS

2003/0193328 A1* 10/2003 Iwashita ................. 324/207.2
2010/0040315 A1*  2/2010 Ozaki et al. ............... 384/446
2010/0064788 A1   3/2010 Höfler et al.
2013/0221952 A1   8/2013 Ozaki et al.

FOREIGN PATENT DOCUMENTS

JP   A-2006-322875        11/2006
JP      2012131272 A  *   7/2012

* cited by examiner

CABLE WITH SENSOR

The present application is based on Japanese patent application No. 2014-257348 filed on Dec. 19, 2014, the entire contents of which are incorporated herein by reference.

BACKGROUND OF THE INVENTION

1. Field of the Invention

This invention relates to a cable with a sensor, in which that sensor is connected to one end of a cable section composed of a plurality of electrically insulated wires covered with a sheath.

2. Description of the Related Art

Conventionally, for example, a cable with a sensor is known that is used in a detecting device to detect a physical quantity in a vehicle, and in which that sensor is arranged at an end of a cable section. (See, e.g. JP-A-2006-322875 below.)

The cable with the sensor disclosed by JP-A-2006-322875 is equipped with a Hall IC, which is used in a rotation detecting device for vehicle to detect a strength of a magnetic field, a wire (cable section) with its core, which is connected to an IC lead drawn from the Hall IC, and a resin member, which is molded to cover and fix the Hall IC and the wire together. The Hall IC is a sensor, which is disposed adjacent to a wheel, to detect a strength of a magnetic field, which varies with rotation of that wheel.

In view of the problem that when the wire is drawn from the resin member in an axial direction of the Hall IC, the wire interferes with other parts (vehicle members such as a suspension arm, a brake dust cover, etc.) which are mounted on the vehicle body or the vehicle, the above cable with the sensor is configured in such a manner that the wire is drawn from the resin member perpendicularly to the axis of the Hall IC. That is, inside the resin member the wire is curved at a circular arc angle of 90 degrees.

See e.g. JP-A-2006-322875 (Paragraphs 0006 and 0042).

SUMMARY OF THE INVENTION

Now, as in the cable with the sensor disclosed by JP-A-2006-322875, bending the wire within the resin member has caused voids (bubbles) in that resin member when that resin member has been molded. The occurrence of voids in the resin member leads to a lowering in strength of the resin member or a lowering in waterproof properties of the resin member, and is likely to lower durability of the cable with the sensor.

In view of the foregoing, the present inventors have intensively studied about the cause of the voids and a solution thereto, and have achieved the present invention. Accordingly, it is an object of the present invention to provide a cable with a sensor, which is capable of suppressing the occurrence of voids, even when a cable section is partially bent and held in a molded resin member.

According to an embodiment of the invention, a cable with a sensor comprises:

a plurality of electrically insulated wires, each of which comprises a central conductor and an insulator for coating the central conductor;

a sheath for covering the plurality of electrically insulated wires together;

a sensor including a sensor body including a detecting element, and lead wires for being drawn from the sensor body and connected to the central conductors, respectively; and a housing for sealing one end of the sheath, while receiving at least a portion of the sensor, the housing including a receiving portion for receiving the at least portion of the sensor, a lead out portion for the sheath being drawn therefrom, and a curved cylinder section having a circular cross section, the curved cylinder section being provided between the receiving portion and the lead out portion to hold the plurality of electrically insulated wires in a curved state, the curved cylinder section being made of a molded resin formed in a circular cross sectional shape at right angles to a direction of extending of the plurality of electrically insulated wires, wherein the plurality of electrically insulated wires are held in the middle of the circular cross section of the curved cylinder section.

In the above embodiment, the following modifications and changes may be made.

(i) The plurality of electrically insulated wires are exposed from the sheath and held in the curved cylinder section.

(ii) At the circular cross section of the curved cylinder section, when an outer to outer peripheral surface distance is defined as a shortest distance from any point on an outer peripheral surface of the curved cylinder section to an outer peripheral surface of the insulator of one of the plurality of electrically insulated wires, a difference between a maximum value and a minimum value of the outer to outer peripheral surface distance is within 2 mm.

(iii) The plurality of electrically insulated wires are being covered with the sheath at the curved cylinder section.

(iv) At the circular cross section of the curved cylinder section, when an outer to outer peripheral surface distance is defined as a shortest distance from any point on an outer peripheral surface of the curved cylinder section to an outer peripheral surface of the sheath, a difference between a maximum value and a minimum value of the outer to outer peripheral surface distance is within 2 mm.

(v) The receiving portion includes a cylindrical portion including an opening formed therethrough and a receiving space formed inside, wherein the sensor body is arranged in the receiving space formed inside the cylindrical portion.

(vi) The sensor body is exposed to outside from the opening of the cylindrical portion.

(vii) The sensor body is partially jutted out from the cylindrical portion.

Points of the Invention

The cable with the sensor according to the present invention allows for suppressing the occurrence of voids in the molded resin member, with the cable section being partially bent and held in the molded resin member.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First Embodiment

Figure 1A:
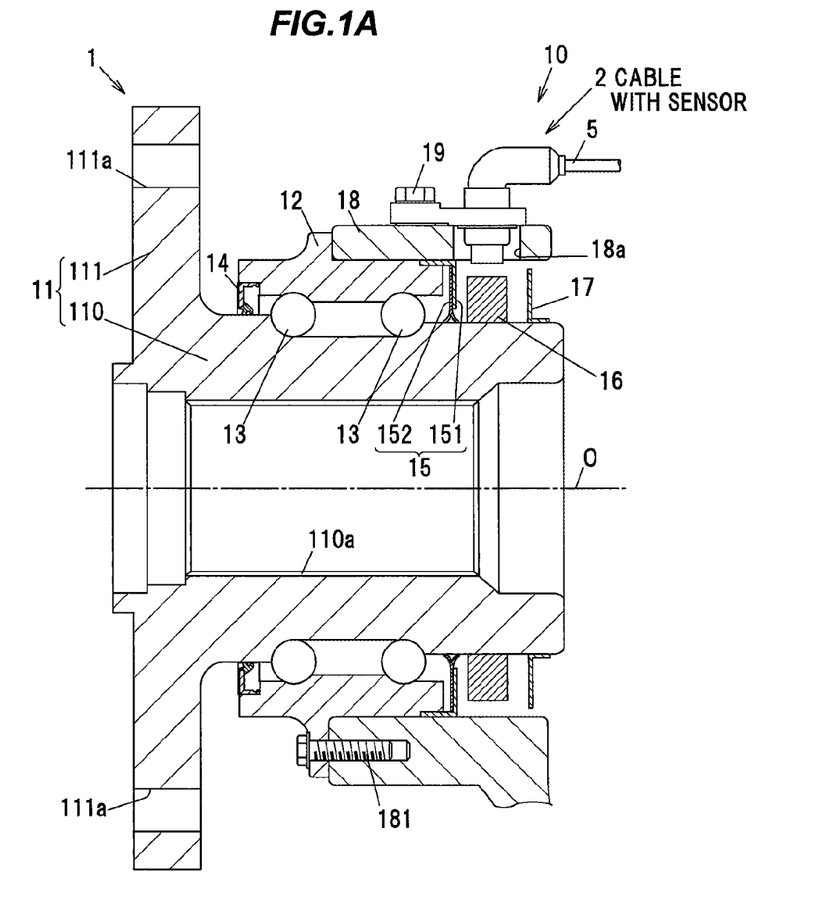
FIG. 1A is an overall cross sectional view showing a wheel bearing device with a module with a sensor in a first embodiment according to the present invention applied thereto.
Figure 1B:
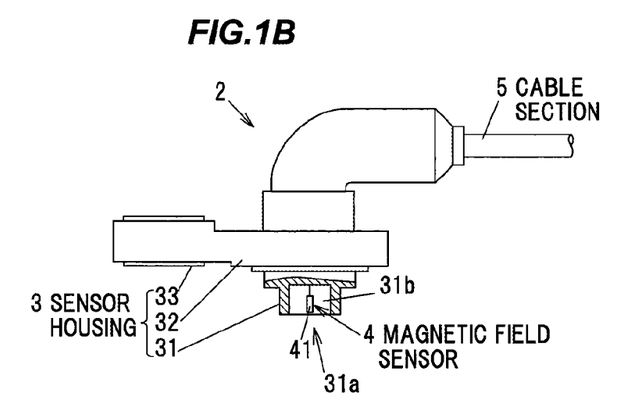
FIG. 1B is a partially cutaway configuration view showing the module with the sensor.
Figure 1C:
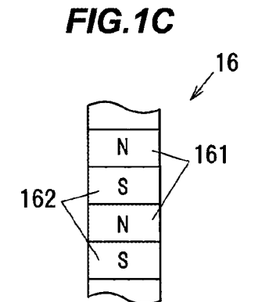
FIG. 1C is a plan view showing a magnetic encoder for the wheel bearing device.

FIG. 1A is an overall cross sectional view showing a wheel bearing device 1 with a module with a sensor in a first embodiment according to the present invention applied thereto. FIG. 1B is a partially cutaway configuration view showing the module with the sensor. FIG. 1C is a plan view showing a magnetic encoder 16 for the wheel bearing device 1.

(Configuration of the Wheel Bearing Device)

The wheel bearing device 1 includes an inner ring 11 having a circular cylindrical body 110, and a flange 111 for a wheel to be attached thereto, an outer ring 12 disposed around an outer circumferential side of the body 110 of the inner ring 11, a plurality of rolling elements disposed between the inner ring 11 and the outer ring 12, a moving body 13, and a rotation detecting device 10 to detect a rotational speed of the inner ring 11 relative to the outer ring 12.

The body 110 of the inner ring 11 is formed with a spline mating portion 110a at the center thereof to connect a drive shaft along a rotation axis O. The flange 111 of the inner ring 11 is formed integrally with the body 110 in such a manner as to be radially jutted out radially from the body 110. The flange 111 is formed with a plurality of through holes 111a for unillustrated wheel attaching bolts to be press fitted therein, respectively.

The outer ring 12 is formed in a circular cylindrical shape, and fixed by a plurality of bolts 181 (in FIG. 1 only one bolt 181 shown) to a knuckle 18 to be connected to a vehicle body via a suspension. The knuckle 18 is formed with a through hole 18a to attach a cable 2 with a sensor described later.

An annular space between the inner ring 11 and the outer ring 12 is sealed by a first sealing member 14 and a second sealing member 15. The first sealing member 14 is disposed around a flange 111 side of the inner ring 11, while the second sealing member 15 is disposed around the opposite side (vehicle body side) of the inner ring 11. The second sealing member 15 is composed of a cored bar 151 having an L-shaped cross section, and an elastic member 152, which is vulcanization bonded to the cored bar 151, and a circular cylinder section, which is formed around an outer periphery of the cored bar 151, is press fitted into an outer peripheral surface of the outer ring 12.

The rotation detecting device 10 is configured in such a manner as to include a magnetic encoder 16, which is fixed to an outer periphery of the body 110 of the inner ring 11, and a cable 2 with a sensor, which is disposed opposite that magnetic encoder 16. The magnetic encoder 16 is an annular member that is fitted around an outer circumferential surface of the body 110 of the inner ring 11, and as shown in FIG. 1C, include a plurality of N magnetic poles 161 and a plurality of S magnetic poles 162 arranged alternately in a circumferential direction thereof. A covering member 17 to suppress foreign matter adhering to the magnetic encoder 16 is attached to around an outer circumferential surface at a vehicle body side end of the body 110 of the inner ring 11.

The magnetic encoder 16 rotates together with the inner ring 11, and a change in magnetic properties of the magnetic poles (N poles 161 or S poles 162) at a portion facing the cable 2 with the sensor in the through hole 18a results from the rotation of the inner ring 11. The rotation detecting device 10 detects the change in magnetic properties of the magnetic encoder 16 at the portion facing the cable 2 with the sensor, from rotation of the wheel attached to the flange 111 of the inner ring 11. The cable 2 with the sensor is fixed by a bolt 19 to the outer ring 12.

As shown in FIG. 1B, the cable 2 with the sensor includes a magnetic field sensor 4 to detect a magnetic field of the magnetic encoder 16, a cable section 5 composed of a plurality of electrically insulated wires to be described later and a sheath for covering the plurality of electrically insulated wires together, and a sensor housing 3 for receiving the magnetic field sensor 4. The sensor housing 3 includes a receiving case 31 made of a resin for receiving the magnetic field sensor 4, a molded body 32 made of a resin molded with the receiving case 31 at least partially covered therewith, and a fixing ring 33 made of a cylindrical metal for the bolt 19 to be inserted therein.

The molded body 32 is molded with a body 41 of the magnetic field sensor 4 held in the receiving case 31. This molding is performed by injecting a high temperature molten resin into a die and solidifying the injected molten resin.

(Configuration of the Cable with the Sensor)

Figure 2A:
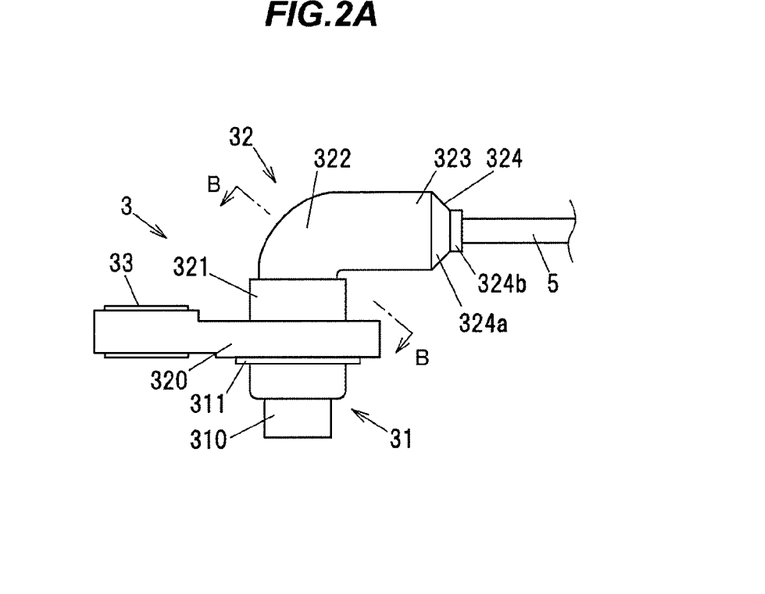
FIG. 2A is a front view showing an appearance of a cable with a sensor.
Figure 2B:
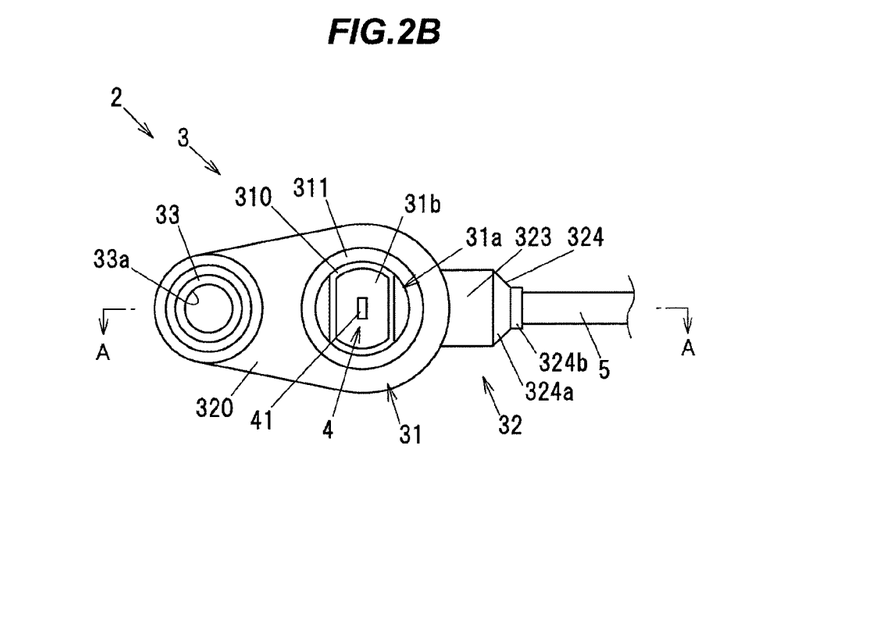
FIG. 2B is a bottom view showing an appearance of the cable with the sensor.
Figure 3:
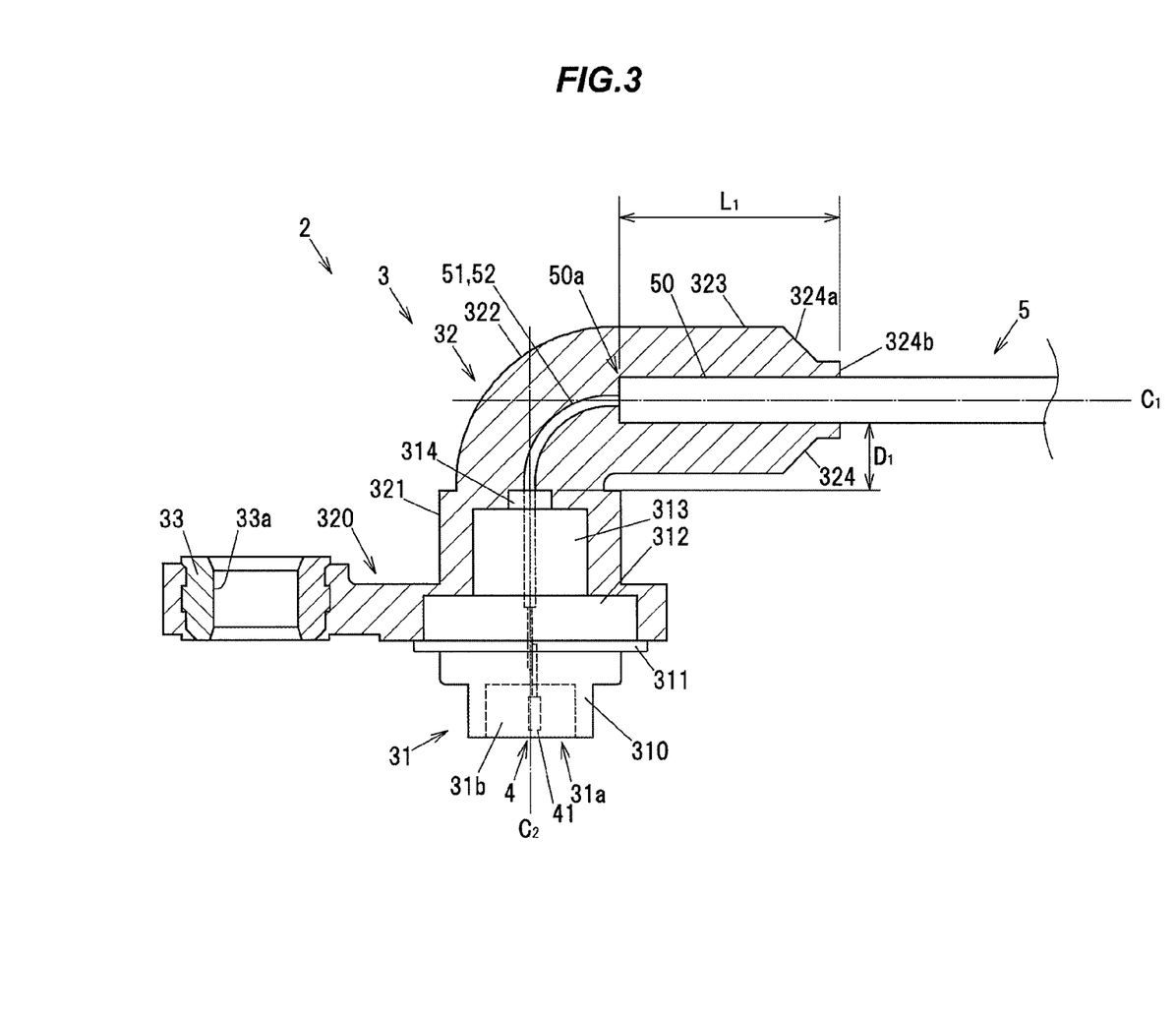
FIG. 3 is a cross sectional view along A-A line in FIG. 2B.
Figure 4A:
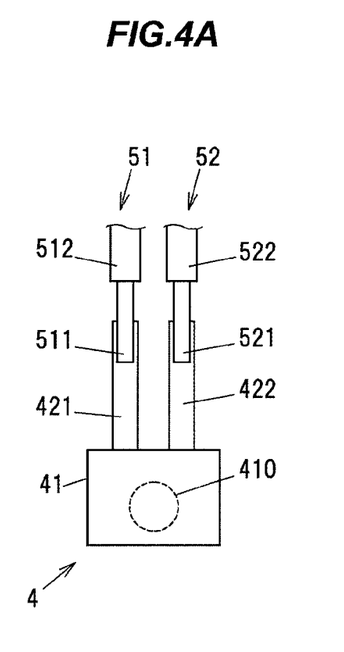
FIG. 4A is a plan view showing connections between a magnetic field sensor and first and second electrically insulated wires of a cable section.
Figure 4B:
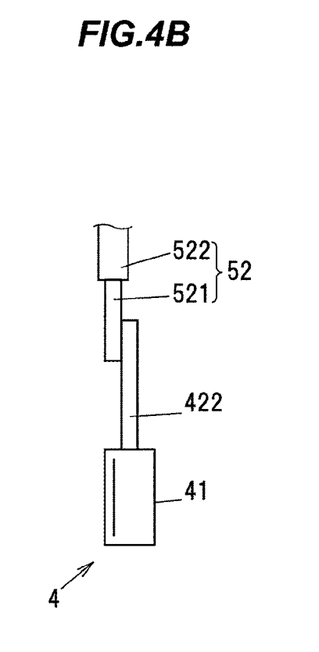
FIG. 4B is a side view showing the connections between the magnetic field sensor and the first and second electrically insulated wires of the cable section.

Next, a configuration of the cable 2 with the sensor will be described with reference to FIGS. 2 to 4. FIG. 2A is a front view showing an appearance of the cable 2 with the sensor, and FIG. 2B is a bottom view showing an appearance of the cable 2 with the sensor. FIG. 3 is a cross sectional view along A-A line in FIG. 2B. FIG. 4A is a plan view showing connections between the magnetic field sensor 4 and first and second electrically insulated wires 51 and 52 of the cable section 5, and FIG. 4B is a side view showing the connections between the magnetic field sensor 4 and the first and second electrically insulated wires 51 and 52 of the cable section 5.

As shown in FIGS. 2A, 2B, and 3, the receiving case 31 includes a cylindrical portion 310 including an opening 31a formed therethrough so that the body 41 of the magnetic field sensor 4 faces outside, a flange 311 formed larger in diameter than the cylindrical portion 310, and first, second, and third held portions 312, 313 and 314, which are held in the molded body 32. The first held portion 312 is formed in a circular cylindrical shape smaller in diameter than the flange 311, and the second held portion 313 is formed in a circular cylindrical shape smaller in diameter than the first held portion 312. Moreover, the third held portion 314 is in a circular cylindrical shape smaller in diameter than the second held portion 313, and is located farthest from the flange 311.

The body 41 of the magnetic field sensor 4 is disposed in a receiving space 31b formed inside the cylindrical portion 310. Note that although in this embodiment, the entire magnetic field sensor 4 is received in the receiving case 31, the magnetic field sensor 4 may partially be jutted out from the receiving case 31. In other words, the receiving case 31 may at least partially receive the magnetic field sensor 4. This receiving case 31 is one aspect of a "receiving portion" according to the present invention.

The molded body 32 is formed integrally with the receiving case 31 with the cylindrical portion 310 and the flange 311 of the receiving case 31 exposed to outside. The molded body 32 includes a flange 320, which is fixed to the knuckle 18 (shown in FIG. 1A), a case holding portion 321, which holds the first, second, and third held portions 312, 313 and 314 of the receiving case 31, a lead out portion 324 for the cable section 5 being drawn therefrom, a curved cylinder section 322 and a circular cylinder section 323, which are provided between the receiving case 31 held in the case holding portion 321 and the lead out portion 324.

The flange 320 is formed in such a manner as to be jutted out from the case holding portion 321, and hold the fixed ring 33. The fixing ring 33 is formed with a bolt inserting hole 33a for the bolt 19 (shown in FIG. 1A) to be inserted therein. The case holding portion 321 covers the first, second, and third held portions 312, 313 and 314 of the receiving case 31. The curved cylinder section 322 curves and holds the first and second electrically insulated wires 51 and 52 of the cable section 5. The circular cylinder section 323 is formed coaxially with the cable section 5 in the direction of drawing of the cable section 5 and parallel to the rotational axis O of the inner ring 11 (shown in FIG. 1A).

The cable section 5 is drawn parallel to the rotational axis O from the lead out portion 324 of the molded body 32. The lead out portion 324 includes a conical tapered portion 324a, and a small diameter cylinder section 324b, which is smaller in outside diameter than the circular cylinder section 323, and the tapered portion 324a is interposed between the circular cylinder section 323 and the small diameter cylinder section 324b.

In addition, the cable section 5, as shown in FIGS. 3 and 4, includes a sheath 50, and first and second electrically insulated wires 51 and 52. The sheath 50 is sealed with the molded body 32 at one end 50a thereof. The first and second electrically insulated wires 51 and 52 together are being covered with the sheath 50 at the circular cylinder section 323 and the lead out portion 324 of the molded body 32.

The sheath 50 is made of a resin such as urethane or the like, while the molded body 32 is made of a PBT (polybutylene terephthalate) or a nylon. In particular, using, for example, 66 nylon or 612 nylon as the molded body 32 material makes the adhesion between it and the sheath 50 very good.

The first electrically insulated wire 51, as shown in FIG. 4A, is composed of a central conductor 511 made of a highly conductive metal such as copper or the like, and an insulator 512 made of an electrically insulative resin for coating the central conductor 511. Similarly, the second electrically insulated wire 52, as shown in FIG. 4A, is composed of a central conductor 521 made of a highly conductive metal such as copper or the like, and an insulator 522 made of an electrically insulative resin for coating the central conductor 521.

The magnetic field sensor 4 includes a sensor body 41 including a detecting element 410, and a first lead wire 421 and a second lead wire 422, which are drawn from the sensor body 41. The first lead wire 421 is connected to the central conductor 511 of the first electrically insulated wire 51, while the second lead wire 422 is connected to the central conductor 521 of the second electrically insulated wire 52. These connections can be made by welding or soldering.

In this embodiment, the detecting element 410 of the magnetic field sensor 4 is a Hall element to detect a magnetic field by making use of the Hall effect. The detecting element 410 is electrically connected to the first and second lead wires 421 and 422 within the sensor body 41.

In this embodiment, as shown in FIG. 3, the first and second electrically insulated wires 51 and 52 are exposed from the sheath 50 at a curved cylinder section 322 side end of the circular cylinder section 323. That is, the first and second electrically insulated wires 51 and 52 are exposed from one end 50a of the sheath 50 in the circular cylinder section 323, and held in the curved cylinder section 322. The first and second electrically insulated wires 51 and 52 are introduced into the receiving case 31 at the third held portion 314 side, and are connected to the magnetic sensor 4 within the receiving case 31.

Also, in this embodiment, as shown in FIG. 3, when $C_1$ is a central axis of a portion of the sheath 50 which is held in the circular cylinder section 323 and the lead out portion 324 of the molded body 32, and $C_2$ is a central axis of the cylindrical portion 310 of the receiving case 31, the central axes $C_1$ and $C_2$ intersect at an angle of 90 degrees. For this reason, the first and second electrically insulated wires 51 and 52 are curved in a circular arc shape at a central angle of 90 degrees between the circular cylinder section 323 of the molded body 32 and the receiving case 31. It should be noted, however, that the intersecting angle of the central axes $C_1$ and $C_2$ is not limited thereto, but the central axes $C_1$ and $C_2$ may be crossed within a range of 90 degrees±10 degrees. The predetermined angle formed by the central axes $C_1$ and $C_2$ more desirably ranges 90 degrees±5 degrees.

The sheath 50 is held in the circular cylinder section 323 of the molded body 32 over a length of not shorter than 10 mm. In FIG. 3, the length of the portion of the sheath 50 held in the circular cylinder section 323 is denoted by $L_1$. Holding the sheath 50 in the molded body 32 over a length of not shorter than 10 mm allows the sheath 50 to be firmly held, thereby making it possible to prevent ingress of moisture through an outer peripheral surface of the sheath 50.

The sheath 50 has an outer diameter of 5 mm, for example, while each of the first and second electrically insulated wires 51 and 52 has an outer diameter of 1.5 mm, for example. The first and second electrically insulated wires 51 and 52 bent in the curved cylinder section 322 of the molded body 32 have a radius of curvature of not smaller than 3.5 mm and not larger than 10 mm, for example. The distance $D_1$ between the third held portion 314 of the receiving case 31 and the outer peripheral surface of the sheath 50 of the cable section 5 in the direction along the central axis $C_2$ is not smaller than 3.5 mm and not larger than 10 mm, for example.

(Method for Producing the Cable with the Sensor)

Next, a method of producing the cable 2 with the sensor 5 is described with reference to FIG. 5. The cable 2 with the sensor is produced by injecting a high temperature molten resin into an upper die and a lower die and molding the body 32.

Figure 5:
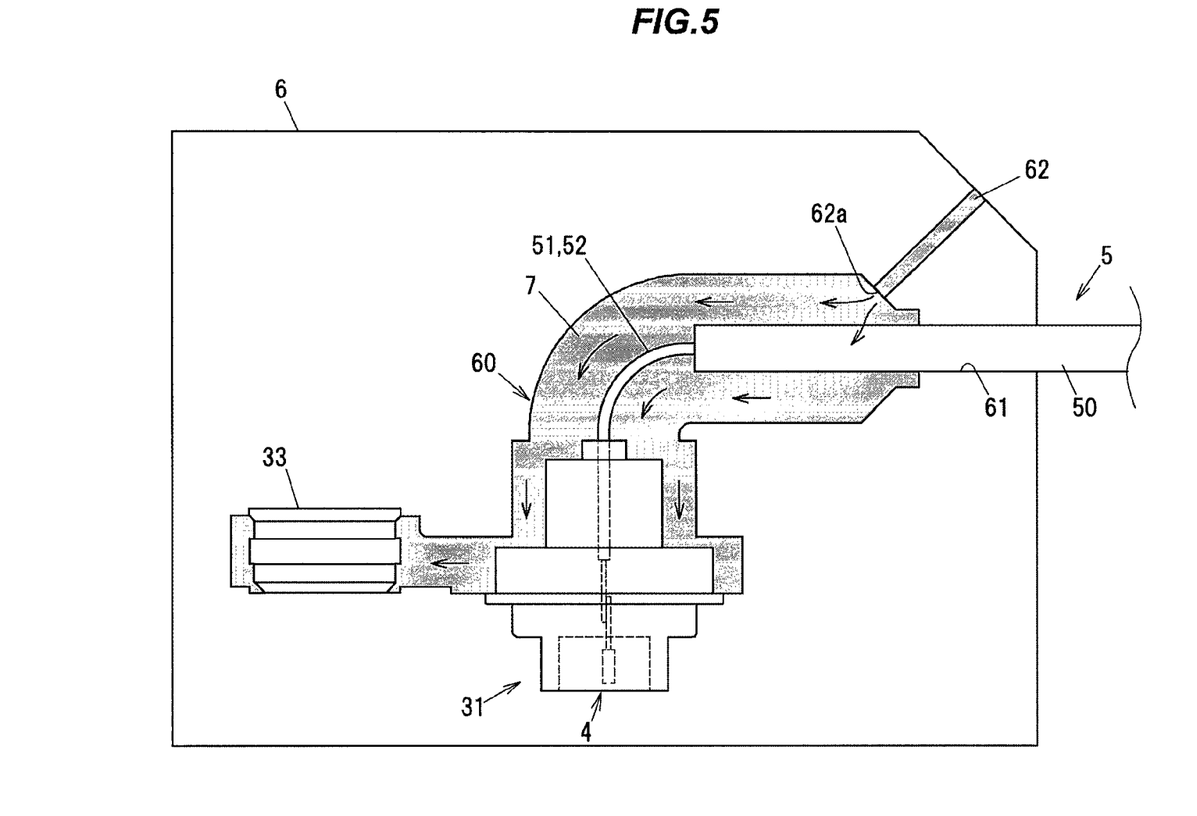
FIG. 5 is a plan view showing a lower die used in producing the cable with the sensor, together with each member disposed on the lower die.

FIG. 5 is a plan view showing a lower die 6 used in producing the cable 2 with the sensor, together with each member disposed on the lower die 6. In FIG. 5, a molten resin 7 to be injected into a lower die 6 side cavity 60 is shown in gray. The upper die to be combined with the lower die 6 is shaped symmetrically with the lower die 6 to form a cavity 60 together with the lower die 6.

On the lower die 6, there are arranged the fixing ring 33, the receiving case 31 with the magnetic field sensor 4 received therein, and one end of the cable section 5. The cable section 5 is disposed on the lower die 6 with the first and second electrically insulated wires 51 and 52 exposed from the sheath 50 and connected to the magnetic field sensor 4. The lower die 6 is formed with a sandwiching portion 61 to sandwich the sheath 50 between the lower die 6 and the upper die. When the upper die overlays the lower die 6, the fixing ring 33, the receiving case 31, and the cable section 5 are sandwiched and fixed between the lower die 6 and the upper die.

The molten resin 7 is injected from an injecting hole 62 into the cavity 60. The injecting hole 62 is extended to the sheath 50 of the cable section 5, and has an opening 62a into a die portion formed in the shape of the tapered portion 324a of the lead out portion 324. The molten resin 7 injected from the injecting hole 62 flows in the cavity 60 in directions of arrows as shown in FIG. 5. That is, the molten resin 7 flows, in turn, through a die portion formed in the shape of the lead out portion 324, a die portion formed in the shape of the circular cylinder section 323, and a die portion formed in the shape of the curved cylinder section 322, and reaches a die portion formed in the shape of the case holding portion 321 and the flange 320. Solidifying the molten resin 7 at a reduced temperature results in the molded body 32.

The heat of the molten resin 7 is dissipated through the lower die 6 and the upper die, and the cable section 5. At this point, it is desirable to evenly lower the temperature of the entire molten resin 7, with no wide dispersion in temperature distribution. This is because an extreme temperature dispersion in the process of solidifying the molten resin 7 results in a negative pressure in its slow solidified portion, tending to cause voids (bubbles) therein.

Accordingly, in this embodiment, the first and second electrically insulated wires 51 and 52 are arranged in the middle of the die portion formed in the shape of the curved cylinder section 322, to thereby suppress the occurrence of voids. That is, since the heat of the molten resin 7 is cooled by the lower die 6 and the upper die, and even by the first and second electrically insulated wires 51 and 52, holding the first and second electrically insulated wires 51 and 52 in the middle of the curved cylinder section 322 allows for homogenizing the temperature distribution of the molten resin 7 in the die portion formed in the shape of the curved cylinder section 322 during production, thereby suppressing the occurrence of voids.

Incidentally, the postures of the first and second electrically insulated wires 51 and 52 in the cavity 60 can be adjusted by adjusting the axial position of the sheath 50 to be sandwiched between the lower die 6 and the upper die. Moreover, passing the molten resin 7 along the first and second electrically insulated wires 51 and 52 allows for holding the molded postures of the first and second electrically insulated wires 51 and 52.

(Cross Sectional Structure of the Curved Cylinder Section 322)

Figure 6A:
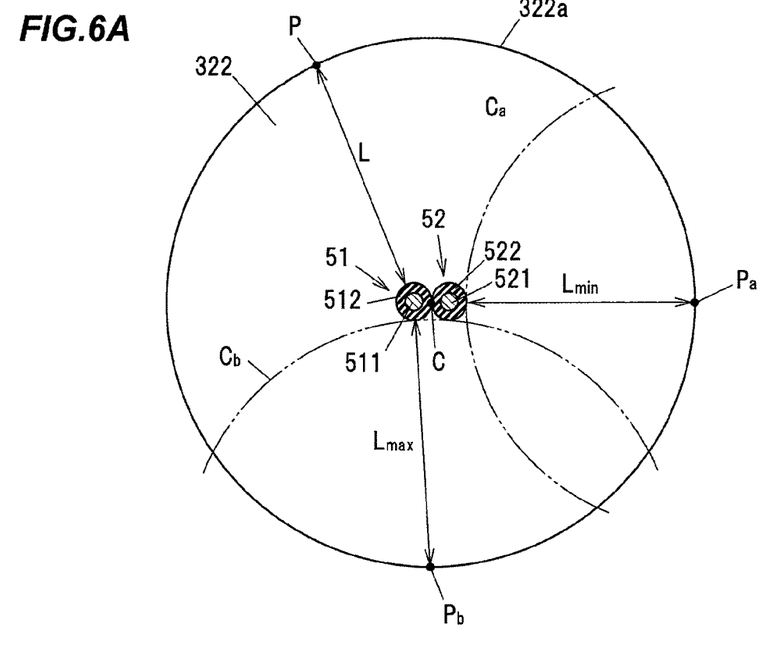
FIG. 6A is a diagram showing one example of a cross section of a curved cylinder section at a B-B line cross section in FIG. 2A.
Figure 6B:
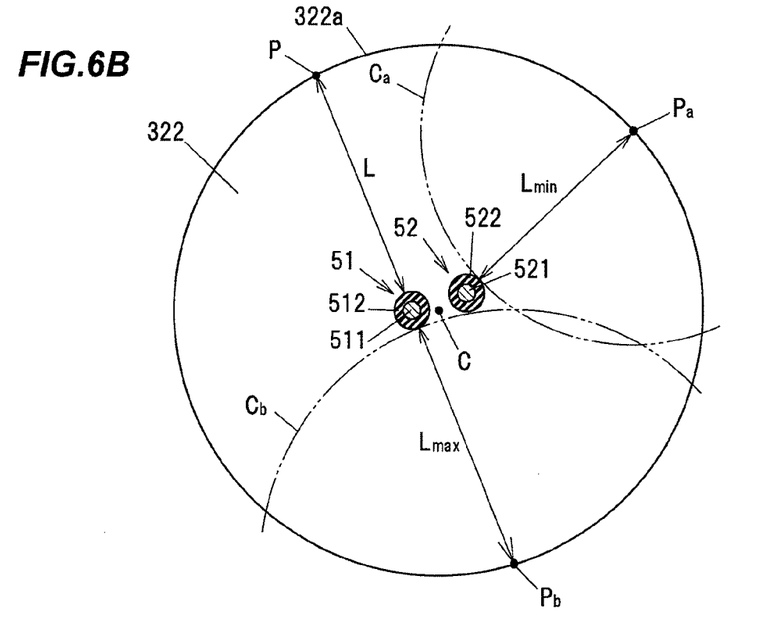
FIG. 6B is a diagram showing another example of the cross section of the curved cylinder section of the B-B line cross section in FIG. 2A.

FIG. 6A shows one example of a cross section of the curved cylinder section 322 at a B-B line cross section in FIG. 2A. FIG. 6B likewise shows another example of the cross section of the curved cylinder section 322 at the B-B line cross section of FIG. 2A. The B-B line cross section is the cross section at right angles to the direction of extending of the first and second electrically insulated wires 51 and 52. Note that in FIGS. 6A and 6B, for clarity of the illustrated contents, the hatching for indicating the cross section of the curved cylinder section 322 is omitted.

As shown in FIGS. 6A and 6B, the curved cylinder section 322 of the molded body 32 is in a circular shape at its cross section at right angles to the direction of extending of the first and second electrically insulated wires 51 and 52. The first and second electrically insulated wires 51 and 52 are held in the middle of the circular cross section of the curved cylinder section 322 as shown in FIGS. 6A and 6B. The diameter of the circular cross section of the curved cylinder section 322 is 10 mm, for example.

Here, at the circular cross section of the curved cylinder section 322, an outer to outer peripheral surface distance L at a point P is defined as a shortest distance from any point P on an outer peripheral surface 322a of the curved cylinder section 322 to an outer peripheral surface of the insulator 512 or 522 of one of the first and second electrically insulated wires 51 and 52. That is, the outer to outer peripheral surface distance L corresponds to a radius of a circle being centered on a point P, and being tangent to the insulator 512 or 522 of one of the first and second electrically insulated wires 51 and 52, and having the smallest radius.

In FIGS. 6A and 6B, a point on the outer circumferential surface 322a of the curved cylinder section 322 at which the outer to outer peripheral surface distance L is a minimum is denoted by $P_a$, and the outer to outer peripheral surface distance L at that point $P_a$ is denoted by $L_{min}$. Further, in FIGS. 6A and 6B, a point on the outer circumferential surface 322a of the curved cylinder section 322 at which the outer to outer peripheral surface distance L is a maximum is denoted by $P_b$, and the outer to outer peripheral surface distance L at that point $P_b$ is denoted by $L_{max}$. Furthermore, in FIGS. 6A and 6B, a part of a circle $C_a$ being centered on the point $P_a$ and being tangent to the insulator 512 or 522 of one of the first and second electrically insulated wires 51 and 52, and a part of a circle $C_b$ being centered on the point $P_b$ and being tangent to the insulator 512 or 522 of one of the first and second electrically insulated wires 51 and 52 are each indicated by a two-dot chain line.

When $\Delta L$ ($\Delta L = L_{max} - L_{min}$) is a difference between $L_{max}$, the maximum value of the outer to outer peripheral surface distance L, and $L_{min}$, the minimum value of the outer to outer peripheral surface distance L, the $\Delta L$ is the smallest when the first electrically insulated wire 51 and the second electrically insulated wire 52 are in contact with each other at the center point C of the circular cross section of the curved cylinder section 322, and the $\Delta L$ increases with increasing distances from that center point C to the first electrically insulated wire 51 and the second electrically insulated wire 52, respectively.

The smaller $\Delta L$ is preferable in order to suppress the occurrence of voids. In this embodiment, the $\Delta L$ is within 2 mm. When the ΔL exceeds 2 mm, voids tend to occur in the curved cylinder section 322 during production. The occurrence of voids during production causes a gradual increase in void size due to a temperature variation during subsequent use of the cable 2 with the sensor, and is likely to lower the strength of the molded body 32. Also, due to ingress of moisture at the other end of the cable section 5, that moisture is likely to flow through a gap between the sheath 50 and the first and second electrically insulated wires 51 and 52, and accumulate in the sensor housing 3.

Comparative Example

Figure 7:
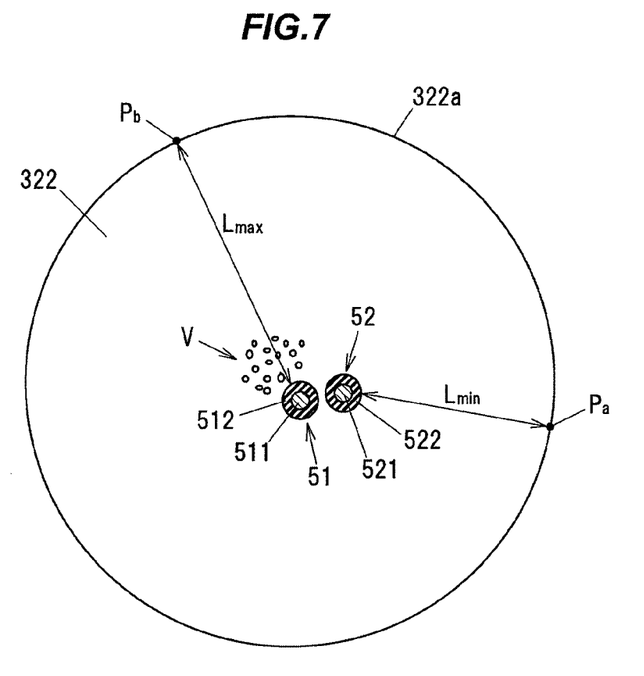
FIG. 7 is a cross sectional view showing a curved cylinder section of a molded body in a comparative example.

FIG. 7 is a cross sectional view showing a curved cylinder section 322 of a molded body 32 in a comparative example. In this comparative example, ΔL, the difference between the maximum value $L_{max}$ and the minimum value $L_{min}$ of the outer to outer peripheral surface distance L exceeded 2 mm, and voids V occurred in a part of the circular cross section of the curved cylinder section 322. This occurrence of the voids V was considered to have resulted from a negative pressure in a last solidified portion of the molten resin 7, because, during the body 32 molding, the molten resin 7 gradually solidified and contracted from an outer peripheral side of the die portion formed in the shape of the curved cylinder section 322, and was radially thick. Thus, in the first embodiment, the ΔL is set within 2 mm to thereby suppress the occurrence of such voids V.

(Functions and Advantageous Effects of the First Embodiment)

In the cable 2 with the sensor in the first embodiment described above, since the first and second electrically insulated wires 51 and 52 are held in the middle of the circular cross section of the curved cylinder section 322 of the molded body 32, the temperature distribution of the molten resin 7 in the die portion formed in the shape of the curved cylinder section 322 during production is homogenized, thereby suppressing the occurrence of voids. In particular, in this embodiment, since the ΔL, the difference between the maximum value $L_{max}$ and the minimum value $L_{min}$ of the outer to outer peripheral surface distance L at the circular cross section of the curved cylinder section 322 is within 2 mm, it is possible to securely prevent the occurrence of the voids V. This allows for increasing the durability of the sensor housing 3, and preventing moisture from accumulating in the sensor housing 3.

In addition, in the cable 2 with the sensor in the first embodiment, the first and second electrically insulated wires 51 and 52 exposed from the end 50a of the sheath 50 of the cable section 5 are bent at the curved cylinder section 322 of the molded body 32, in such a manner that the central axis $C_1$ of the portion of the sheath 50 held in the molded body 32 intersects the center axis $C_2$ of the cylindrical portion 310 of the receiving case 31 at a predetermined angle (90 degrees). This allows for preventing the cable section 5 drawn from the molded body 32 from interfering with the other members, etc. mounted on the vehicle, while making it possible to reduce the size of the molded body 32.

Furthermore, in the cable 2 with the sensor in the first embodiment, the body 41 of the magnetic field sensor 4 is received in the cylindrical portion 310 of the receiving case 31, while the molded body 32 holds the first, second, and third held portions 312, 313 and 314 of the receiving case 31. This allows for, during the body 32 molding, preventing the molten resin 7 from direct contact with the body 41 of the magnetic field sensor 4, and thereby preventing damage to the detecting element 410 due to the heat of the molten resin 7.

Second Embodiment

Figure 8:
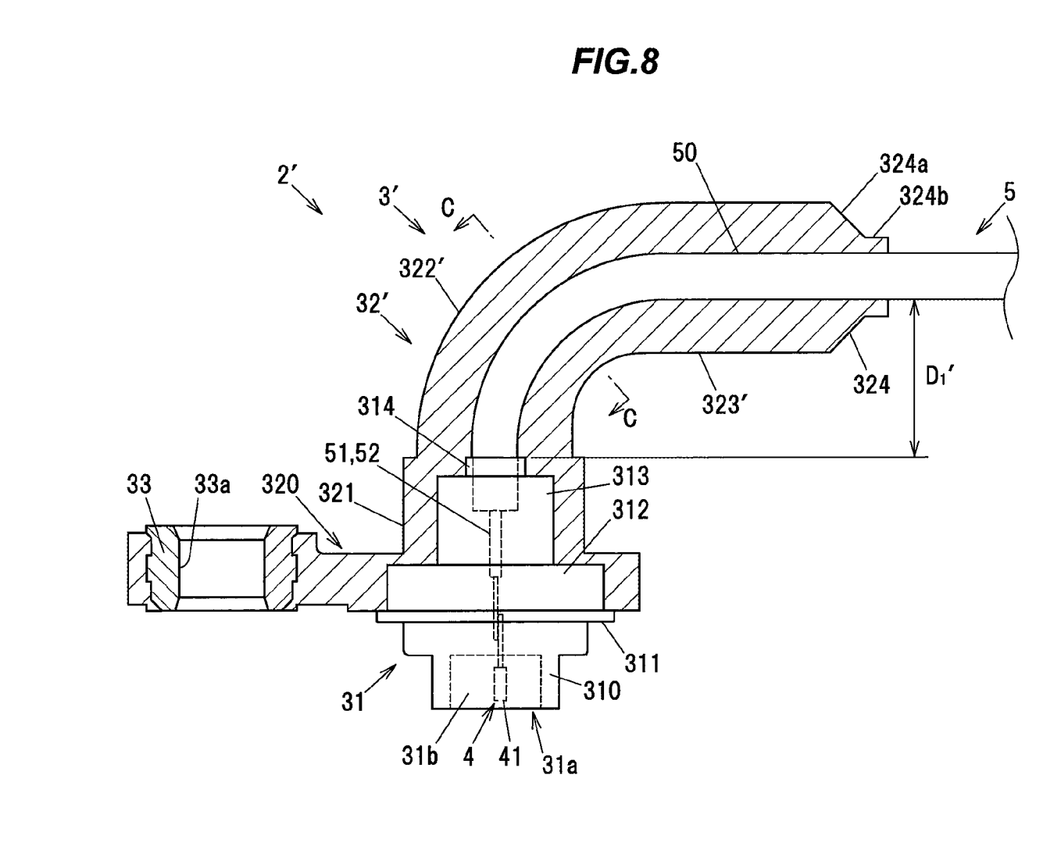
FIG. 8 is a cross sectional view showing a cable with a sensor in a second embodiment according to the present invention.
Figure 9:
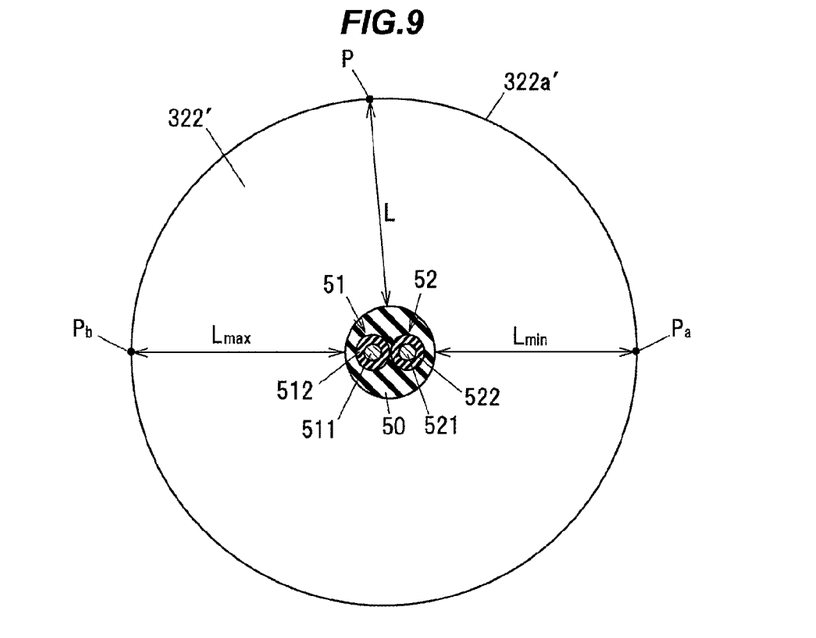
FIG. 9 is a cross sectional view along C-C line in FIG. 8.

Next, a second embodiment according to the present invention will be described with reference to FIGS. 8 and 9. FIG. 8 is a cross sectional view showing a cable 2' with a sensor in the second embodiment. FIG. 9 is a cross sectional view along C-C line in FIG. 8. Note that this cable 2' with the sensor is produced by a producing method similar to that of the cable 2 with the sensor in the first embodiment.

The cable 2' with the sensor in the second embodiment includes a molded body 32' in a sensor housing 3', which differs in shape from the molded body 32 in the sensor housing 3 in the first embodiment, and the cable 2' with the sensor in the second embodiment is configured in the same manner as the cable 2 with the sensor in the first embodiment, except that the one end of the sheath 50 of the cable section 5 is received in the receiving case 31, with the sheath 50 drawn from the third held portion 314 of the receiving case 31. In FIGS. 8 and 9, elements substantially in common with those described for the first embodiment are given the same numerals or characters used in FIGS. 3 and 6, and duplicated descriptions thereof are omitted.

The molded body 32' of the sensor housing 3' in the second embodiment includes a curved cylinder section 322', which corresponds to the curved cylinder section 322 of the sensor housing 3 in the first embodiment, but the radius of curvature of the central axis of this curved cylinder section 322' is formed larger than the radius of curvature of the central axis of the curved cylinder section 322 in the first embodiment.

This difference in the radius of curvature results from the bending of the first and second electrically insulated wires 51 and 52 together with the sheath 50, with the first and second electrically insulated wires 51 and 52 covered by the sheath 50 of the cable section 5 in the curved cylinder section 322'. That is, since the sheath 50 is difficult to bend because of being larger in outer diameter and higher in hardness than the first and second electrically insulated wires 51 and 52 (in FIG. 6 only the first electrically insulated wire 51 shown), the radius of curvature of the central axis of the curved cylinder section 322' of the sensor housing 3' is larger than the radius of curvature of the central axis of the curved cylinder section 322 in the first embodiment. Accordingly, in the sensor housing 3' in the second embodiment, the distance $D_1'$ between the third held portion 314 of the receiving case 31 and the outer surface of the sheath 50 in the range held linearly in the circular cylinder section 323' of the molded body 32' is on the order of twice the distance $D_1$ in the sensor housing 3 in the first embodiment.

On the other hand, in the sensor housing 3' in the second embodiment, since the sheath 50 is covered with the molded body 32' over the long range, it is possible to ensure sufficient waterproof properties, even using the lower cost PBT than the nylon as the molded body 32' material.

As shown in FIG. 9, at a circular cross section of the curved cylinder section 322', when an outer to outer peripheral surface distance L at a point P is defined as a shortest distance from any point P on an outer peripheral surface 322a' of the curved cylinder section 322' to an outer peripheral surface of the sheath 50, when the center of the sheath 50 is coincident with the center of the circular cross section of the curved cylinder section 322', the outer to outer peripheral surface distance L is equal at any point P on the outer peripheral surface 322a' of the curved cylinder section 322', or when the center of the sheath 50 is located off the center of the circular cross section of the curved cylinder section 322', the outer to outer peripheral surface distance L varies according to a position of the point P.

In FIG. 9, a point on the outer circumferential surface 322a' of the curved cylinder section 322' at which the outer to outer peripheral surface distance L is a minimum is denoted by $P_a$, and the outer to outer peripheral surface distance L at that point $P_a$ is denoted by $L_{min}$. Also, in FIG. 9, a point on the outer circumferential surface 322a' of the curved cylinder section 322' at which the outer to outer peripheral surface distance L is a maximum is denoted by $P_b$, and the outer to outer peripheral surface distance L at that point $P_b$ is denoted by $L_{max}$.

When $\Delta L$ ($\Delta L = L_{max} - L_{min}$) is a difference between $L_{max}$, the maximum value of the outer to outer peripheral surface distance L, and $L_{min}$, the minimum value of the outer to outer peripheral surface distance L, the $\Delta L$ is the smallest when the center of the sheath 50 is coincident with the center of the circular cross section of the curved cylinder section 322', and the $\Delta L$ increases with increasing distance from the center of the circular cross section of the curved cylinder section 322' to the center of the sheath 50.

The smaller $\Delta L$ allows for homogenizing the temperature distribution of the molten resin in the die portion formed in the shape of the curved cylinder section 322' during production, thereby suppressing the occurrence of voids. In the second embodiment, the $\Delta L$ is within 2 mm. When the $\Delta L$ exceeds 2 mm, voids tend to occur in the curved cylinder section 322' during production.

Comparative Example

Figure 10:
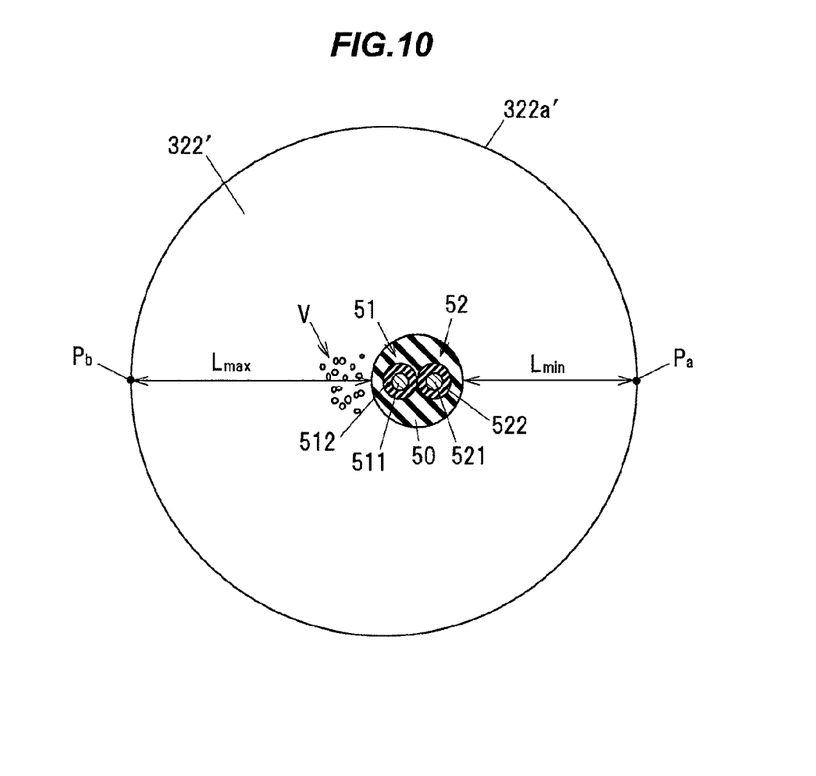
FIG. 10 is a cross sectional view showing a curved cylinder section of a molded body in a comparative example.

FIG. 10 is a cross sectional view showing a curved cylinder section 322' of molded body 32' in a comparative example. In this comparative example, $\Delta L$, the difference between the maximum value $L_{max}$ and the minimum value $L_{min}$ of the outer to outer peripheral surface distance L exceeded 2 mm, and voids V occurred in a part of the circular cross section of the curved cylinder section 322'. This occurrence of the voids V was considered to have resulted from a negative pressure in a radially thick portion of the molten resin, because, during the body 32' molding, the molten resin gradually solidified and contracted from an outer peripheral side of the die portion formed in the shape of the curved cylinder section 322'. Thus, in the second embodiment, the $\Delta L$ is set within 2 mm to thereby suppress the occurrence of such voids V.

(Functions and Advantageous Effects of the Second Embodiment)

In the cable 2' with the sensor in the second embodiment described above, since the sheath 50 is held in the middle of the circular cross section of the curved cylinder section 322' of the molded body 32', the temperature distribution of the molten resin in the die portion formed in the shape of the curved cylinder section 322' during production is homogenized, thereby suppressing the occurrence of voids. In particular, in the second embodiment, since the $\Delta L$, the difference between the maximum value $L_{max}$ and the minimum value $L_{min}$ of the outer to outer peripheral surface distance L at the circular cross section of the curved cylinder section 322' is within 2 mm, it is possible to securely prevent the occurrence of the voids V. This allows for increasing the durability of the sensor housing 3', and preventing moisture from accumulating in the sensor housing 3'.

SUMMARY OF THE EMBODIMENTS

Next, the technical concept that is ascertained from the embodiment described above will be described with the aid of the reference characters and the like in the embodiment. It should be noted, however, that each of the reference characters in the following description should not be construed as limiting the constituent elements in the claims to the members and the like specifically shown in the embodiment.

[1] A cable (2, 2') with a sensor, comprising:
a plurality of electrically insulated wires (51, 52) each composed of a central conductor (511, 521) and an insulator (521, 522) for coating the central conductor (511, 521);
a sheath (50) for covering the plurality of electrically insulated wires (51, 52) together;
a sensor (4) including a sensor body (41) including a detecting element (410), and lead wires (421, 422) for being drawn from the sensor body (41) and connected to the central conductors (511, 521), respectively; and
a housing (sensor housing 3, 3') for sealing one end of the sheath (50), while receiving at least a portion of the sensor (4), the housing (sensor housing 3, 3') including a receiving portion (receiving case 31) for receiving the at least portion of the sensor (4), a lead out portion (324) for the sheath (50) being drawn therefrom, and a curved cylinder section (322, 322') having a circular cross section, the curved cylinder section being provided between the receiving portion (receiving case 31) and the lead out portion (324) to hold the plurality of electrically insulated wires in a curved state (51, 52), the curved cylinder section (322, 322') being made of a molded resin formed in a circular cross sectional shape at right angles to a direction of extending of the plurality of electrically insulated wires (51, 52), the plurality of electrically insulated wires (51, 52) being held in the middle of the circular cross section of the curved cylinder section (322, 322').

[2] The cable (2) with a sensor according to [1] above, wherein
the plurality of electrically insulated wires (51, 52) are exposed from the sheath (50) and held in the curved cylinder section (322).

[3] The cable (2) with a sensor according to [2] above, wherein
at the circular cross section of the curved cylinder section (322), when an outer to outer peripheral surface distance (L) is defined as a shortest distance from any point (P) on an outer peripheral surface (322a) of the curved cylinder section (322) to an outer peripheral surface of the insulator (521, 522) of one of the plurality of electrically insulated wires (51, 52), a difference between a maximum value ($L_{max}$) and a minimum value ($L_{min}$) of the outer to outer peripheral surface distance (L) is within 2 mm.

[4] The cable (2') with a sensor according to [1] above, wherein the plurality of electrically insulated wires (51, 52) are being covered with the sheath (50) at the curved cylinder section (322').

[5] The cable (2') with a sensor according to [4] above, wherein at the circular cross section of the curved cylinder section (322'), when an outer to outer peripheral surface distance (L) is defined as a shortest distance from any point (P) on an outer peripheral surface (322a') of the curved cylinder section (322') to an outer peripheral surface of the sheath (50), a difference between a maximum value ($L_{max}$)

and a minimum value ($L_{min}$) of the outer to outer peripheral surface distance (L) is within 2 mm.

Although the embodiment of the present invention has been described above, the embodiment described above should not be construed to limit the invention in the appended claims. It should also be noted that not all the combinations of the features described in the above embodiment are essential to the means for solving the problems of the invention.

Further, the present invention may be appropriately modified and practiced without departing from the spirit and scope thereof. For example, although in the above embodiments it has been described that the present invention is applied to the rotation detecting device 10 for the wheel bearing device 1, the application of the present invention is not limited thereto, but the invention may be applied to a detecting device to detect various physical quantities mounted on the vehicle. In this case, the sensor is not limited to the magnetic field sensor, but it is possible to apply a temperature sensor or a pressure sensor, or a yaw rate sensor, etc. In addition, it is possible to use the present invention in applications other than the vehicular application.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A cable with a sensor, comprising:
   a plurality of electrically insulated wires, each of which comprises a central conductor and an insulator for coating the central conductor;
   a sheath for covering the plurality of electrically insulated wires together;
   a sensor including a sensor body including a detecting element, and lead wires for being drawn from the sensor body and connected to the central conductors, respectively; and
   a housing for sealing one end of the sheath, while receiving at least a portion of the sensor, the housing including a receiving portion for receiving at least the portion of the sensor, a lead out portion for the sheath being drawn therefrom, and a curved cylinder section having a circular cross section, the curved cylinder section being provided between the receiving portion and the lead out portion to hold the plurality of electrically insulated wires in a curved state, the curved cylinder section being made of a one-piece molded resin formed in a circular cross sectional shape at right angles to a direction of extending of the plurality of electrically insulated wires,
   wherein the plurality of electrically insulated wires are configured to suppress the occurrence of voids during the molding of the curved cylinder section by being positioned in the middle of the circular cross section of the curved cylinder section and parallel to the curvature of a center line of the curved cylinder section.

2. The cable with a sensor according to claim 1, wherein the plurality of electrically insulated wires are exposed from the sheath and held in the curved cylinder section.

3. The cable with a sensor according to claim 2, wherein at the circular cross section of the curved cylinder section, when an outer to outer peripheral surface distance is defined as a shortest distance from any point on an outer peripheral surface of the curved cylinder section to an outer peripheral surface of the insulator of one of the plurality of electrically insulated wires, a difference between a maximum value and a minimum value of the outer to outer peripheral surface distance is within 2 mm.

4. The cable with a sensor according to claim 1, wherein the plurality of electrically insulated wires are being covered with the sheath at the curved cylinder section.

5. The cable with a sensor according to claim 4, wherein at the circular cross section of the curved cylinder section, when an outer to outer peripheral surface distance is defined as a shortest distance from any point on an outer peripheral surface of the curved cylinder section to an outer peripheral surface of the sheath, a difference between a maximum value and a minimum value of the outer to outer peripheral surface distance is within 2 mm.

6. The cable with a sensor according to claim 1, wherein the receiving portion includes a cylindrical portion including an opening formed therethrough and a receiving space formed inside, wherein the sensor body is arranged in the receiving space formed inside the cylindrical portion.

7. The cable with a sensor according to claim 6, wherein the sensor body is exposed to outside from the opening of the cylindrical portion.

8. The cable with a sensor according to claim 7, wherein the sensor body is partially jutted out from the cylindrical portion.

9. The cable with a sensor according to claim 1, wherein at least most of the curved insulated wire inside the curved portion is not covered by the sheath.

10. A cable with a sensor, comprising:
    a plurality of electrically insulated wires, each of which comprises a central conductor and an insulator for coating the central conductor;
    a sheath for covering the plurality of electrically insulated wires together;
    a sensor including a sensor body including a detecting element, and lead wires for being drawn from the sensor body and connected to the central conductors, respectively; and
    a housing for sealing one end of the sheath, while receiving at least a portion of the sensor, the housing including a receiving portion for receiving at least the portion of the sensor, a lead out portion for the sheath being drawn therefrom, a straight cylinder section, and a curved cylinder section having a circular cross section, the curved cylinder section being provided between the receiving portion and the lead out portion to hold the plurality of electrically insulated wires in a curved state, the curved cylinder section being made of a one-piece molded resin formed in a circular cross sectional shape at right angles to a direction of extending of the plurality of electrically insulated wires,
    wherein the plurality of electrically insulated wires are configured to suppress the occurrence of voids during the molding of the curved cylinder section by being positioned held in the middle of the circular cross section of the curved cylinder section and the straight cylinder section and parallel to the curvature of a center line of the curved cylinder section and are further parallel to a center line of the straight cylinder section, such that at the circular cross section of the curved cylinder section, when an outer to outer peripheral surface distance is defined as a shortest distance from any point on an outer peripheral surface of the curved cylinder section to an outer peripheral surface of the insulator of one of the plurality of electrically insulated wires, a difference between a maximum value and a minimum value of the outer to outer peripheral surface distance is within 2 mm.

11. The cable with a sensor according to claim 1, wherein the plurality of electrically insulated wires includes first and second electrically insulated wires located on opposite sides of the center line of the curved cylinder section.

12. The cable with a sensor according to claim 3, wherein the plurality of electrically insulated wires includes first and second electrically insulated wires located on opposite sides of the center line of the curved cylinder section.

13. The cable with a sensor according to claim 10, wherein the plurality of electrically insulated wires includes first and second electrically insulated wires located on opposite sides of the center line of the curved cylinder section.

14. The cable with a sensor according to claim 1, wherein the plurality of electrically insulated wires includes a pair of electrically insulated wires in contact with each other which intersect the center line of the curved cylinder section along their lengths.

15. The cable with a sensor according to claim 10, wherein the plurality of electrically insulated wires includes a pair of electrically insulated wires in contact with each other which intersect the center line of the curved cylinder section along their lengths.

* * * * *